United States Patent [19]
Friedman

[11] Patent Number: 5,519,901
[45] Date of Patent: May 28, 1996

[54] WATER-FILLABLE ANCHORS FOR SWIMMING POOL COVERS AND TARPAULINS

[76] Inventor: Jerome Friedman, 3 Briarwood Dr., Somerset, N.J. 08873

[21] Appl. No.: 307,362

[22] Filed: Sep. 16, 1994

Related U.S. Application Data

[63] Continuation-in-part of Ser. No. 922,696, Jul. 30, 1992, abandoned, and a continuation-in-part of Ser. No. 891,405, May 29, 1992, abandoned.

[51] Int. Cl.$^6$ .................................................. E04H 4/10
[52] U.S. Cl. ............................. 4/503; 220/306; 220/578
[58] Field of Search ....................... 4/498, 503; 220/306, 220/578

[56] References Cited

U.S. PATENT DOCUMENTS

| | | | |
|---|---|---|---|
| 1,961,223 | 6/1934 | Jamison | 220/306 |
| 2,935,108 | 5/1960 | Hall | 220/306 X |
| 2,984,382 | 5/1961 | Florsheim, Jr. | 220/306 |
| 3,273,741 | 9/1966 | Faunce | 220/578 X |
| 4,048,678 | 9/1977 | Chillino | 4/503 |
| 4,209,107 | 6/1980 | Crisci | 220/306 |
| 4,995,513 | 2/1991 | Rosler | 220/306 X |

*Primary Examiner*—Robert M. Fetsuga
*Attorney, Agent, or Firm*—Morton Chirnomas

[57] ABSTRACT

A cover for a pool is retained in position by a plurality of water-filled enclosures, each including a container and a lid formed of a substantially rigid, plastic material having a specific gravity of less than one. The elongated, watertight container has a continuous flange about its upper, open end with openings at spaced intervals to receive locking pins integral with the lid. The lid has a pyramidal-shape to prevent water and debris from collecting thereon. The lid outer perimeter has lip engaging the marginal edge of the container flange to retain its shape without bowing due to the expansion of freezing water. The containers and lids are nestable and stackable when not in use. The container flange openings extend downwardly along an tipper portion of the side walls to prevents overfilling. The lid may be hingedly connected to the container, while retaining the nestable, stackable capability. The sloping top of the lid may be provided with small openings or a screen-like arrangement, to prevent debris from entering into the enclosure. The locking pins are easily released from their associated locking openings to empty, clean and store the enclosure. The plastic material withstands extreme outdoor conditions. Yieldable cone-shaped projections are provided along the container interior to support the lid and allow for ice expansion without bowing or cracking. A releasing agent facilitates movement of the ice. A liquid or plastic vapor barrier is provided to substantially prevent water evaporation.

16 Claims, 6 Drawing Sheets

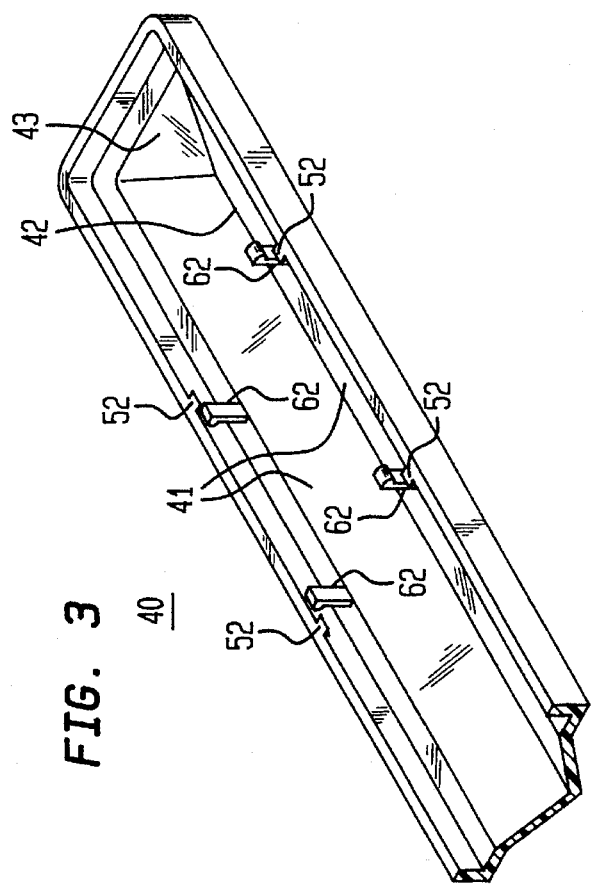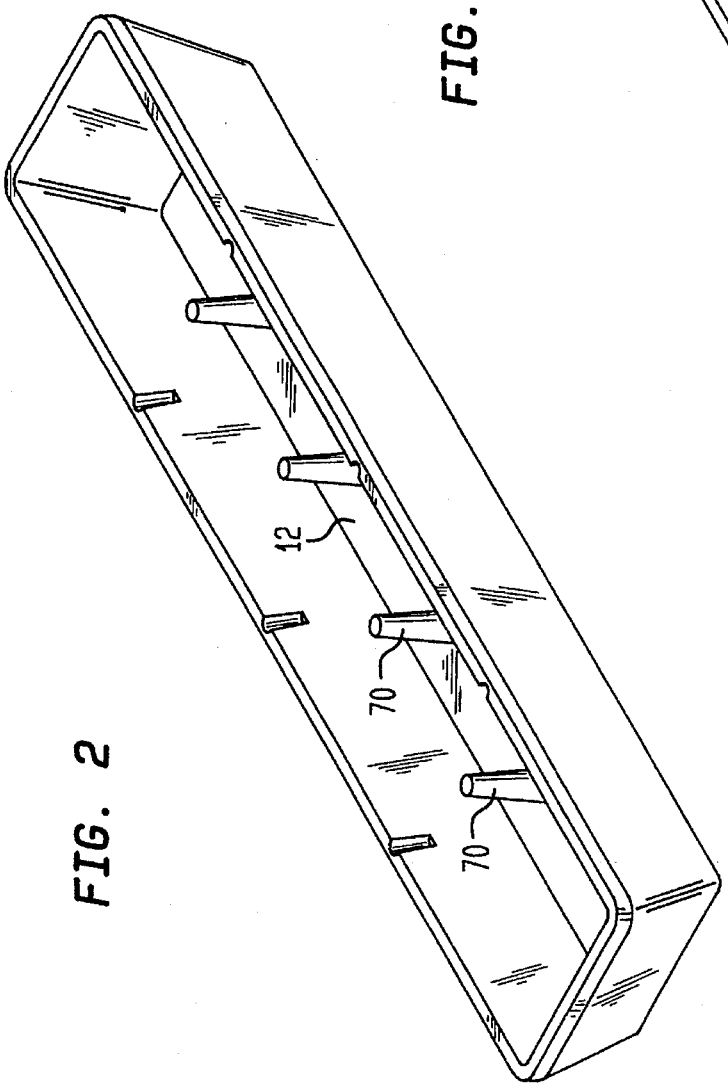

WATER-FILLABLE ANCHORS FOR SWIMMING POOL COVERS AND TARPAULINS

REFERENCE TO RELATED APPLICATION

This is a continuation-in-part application of U.S. application Ser. No. 07/922,696, filed Jul. 30, 1992, now abandoned, and a continuation-in-part application of U.S. application Ser. No. 07/891,405, filed May 29, 1992, now abandoned.

FIELD OF THE INVENTION

The present invention relates to rigid water enclosures, and more particularly, to enclosures comprising a water-fillable container and removable lid releasably secured thereto for holding pool covers and tarpaulins in place and being designed to retain its position on the cover being held due to a design which substantially prevents the container from tipping or rolling and which renders the enclosures nestable and stackable when not in rise. The enclosure includes a vapor barrier to reduce evaporation to an insignificant level.

BACKGROUND OF THE INVENTION

Outdoor swimming pools and other outdoor structures located in geographic regions having a winter season are typically protected from the elements or "winterized" to prevent them from being damaged and, particularly with respect to pools, to reduce the amount of clean-up operations necessary to place them in condition for the warm summer season. For example, in the case of completely or partially uncovered swimming pools, not only rain or snow but also debris in the form of fallen leaves, dirt, or other particles carried by wind and rain, tend to collect therein and make the clean-up job upon re-opening the pool much more complicated and time-consuming. Thus, it is extremely advantageous to provide a cover or other protection to limit the amount of debris which may be collected in the pool to the smallest practical extent. Pool covers are also an important safety feature to prevent accidental drownings when the pool is not in use. If the pool cover is properly held down around its perimeter, it will support the weight of a person or animal that may accidentally fall in the pool. Therefore, it is extremely important to provide a reliable securing method throughout the period when the pool is not in use and the cover is in place.

Covers or tarpaulins are also used to cover items that are stored out of doors; such items as lawn furniture, motor vehicles, recreational vehicles, woodpiles and other articles too numerous to specify more particularly herein. However, the heavy winds of winter and uneven collection or pooling of water may also lead to the covers or tarpaulins being partially or completely removed front the items which they are supposed to protect from the elements.

Techniques for protecting swimming pools in geographic areas where such pools are not used year-round fall into three general categories. The first technique comprises the use of a mesh cover which allows precipitation, such as rain, to pass therethrough and collect in the pool, the mesh cover being held in place by resilient tie members, such as springs or bungee cord attached to the perimeter of the cover and held taut by hooking the springs or bungee cords to anchoring members, such as pop-up pins set at spaced intervals in a deck surrounding the pool, or other suitable anchoring means provided either in the deck or driven into the ground surrounding the deck, the cover being of a size sufficient to cover the pool and a marginal portion thereof surrounding the pool. Although this technique prevents large sized debris from collecting in the pool, dirt and small particulate and airborne algae spores are nevertheless able to pass through the mesh cover and collect in the pool, thereby significantly increasing the required clean-up efforts at pool-opening time.

A second protective technique utilizes a mechanized, automatically opened cover, usually formed of rigid vinyl, which is held in place by means of rollers arranged within a guide track that is secured to the deck surrounding the pool or the walls of the pool. Covers of this nature are significantly more expensive than flexible plastic covers.

The third and, by far, the most popular technique employs a flexible plastic cover which rests upon the surface of the water in the pool and which typically extends approximately two feet beyond the perimeter of the pool and onto a deck or other surface surrounding the perimeter. The cover is held in place typically by means of a plurality of elongated water-filled flexible tubes or balloons which are available in various lengths and are most often made of vinyl sheeting with heat-welded seams. The tubes are most often between three and four feet in length and require a valve or closure which prevents the escape of water. The vinyl sheeting from which the tubes are typically formed has a specific gravity greater than one and a properly filled tube is negatively buoyant in water, i.e., will sink in water. A plurality of tubes, often more than one hundred linear feel (100 ft.) worth or approximately twenty five (25) water-tubes, having the afore-described structure are deployed by filling them with water, closing the valves and placing on the outside perimeter of the cover, i.e., that portion of the cover which overlies the pool deck or surface surrounding the perimeter of the pool.

Since water-filled tubes have a tendency to roll under the influence of wind and/or the pitch of the deck, they quite frequently will fall into the pool or roll off the cover's perimeter onto the ground surrounding the pool deck. If the tubes roll onto the ground from the cover, then the cover is easily pushed around by the winter winds and more often than not ends up on the bottom of the pool. If the water-tubes roll into the pool, they sink to the bottom of the pool due to their negative buoyancy, usually taking the cover and all the debris accumulated thereon to the bottom with them and making it extremely difficult to remove the cover from the pool or the water from within the tubes. It thus becomes virtually impossible to lift the tubes out of the water since it is not practical to drain the water from within the tubes when they are beneath the surface of the water. In apparent recognition of the problem of rolling water-tubes, a technique was developed as disclosed in U.S. Pat. No. 3,711,873 to Katzman, issued Jan. 23, 1973 for providing holding means referred to as "cover loops" which are secured at spaced intervals along the perimeter of the cover. Many pool cover manufacturers have integrated loops into the edges and around the perimeters of their covers. In theory, the loops are used by stringing each of the water-tubes through at least one of the loops, either prior to or after filling the water-tube with. The cover loops are intended to help keep the water-tubes from rolling off of the cover and onto the ground surrounding the deck of the pool. Even if the water-tubes do roll off the cover onto the ground, the cover is theoretically still held in place by the loops around the water-tubes. However, in practice, it has been found that the loops may contribute to loss of water from the water-tubes by increasing the strain placed on the tubes' valves. Additionally, the loops cannot prevent the water-tubes from rolling into the pool itself, and they usually compound the problems referred to hereinabove by almost ensuring that the pool cover will be dragged into the pool by the water-tubes due to its attachment via the cover loops.

Another technique utilized to overcome the disadvantage of a tube which tends to roll, comprises a pair of tubes joined to one another along a longitudinal seam. This technique suffers from the disadvantage that it tends to weaken both tubes along the seam. Still another technique is to weld the tube to the cover. However, this adds considerably to the cost of manufacturing the cover and it does overcome many of the disadvantages of the water-tubes which include the fact that the flexible vinyl utilized to form the tubes is highly susceptible to abrasion, seam-splitting and leaking around the valve. Any openings in the tube due to a poor or damaged seam or a leak in the valve allows the water to leak from the tube, rendering the tube useless as a means of anchoring the cover. Another problem common to all of the water-tubes is leaking around the valve dine to poor welding or due to damage to the valve. The most common valve utilized is referred to as a Roberts valve.

Flexible plastic mesh covers can also be used in the same manner as solid vinyl pool covers, i.e. held in place by water-tubes, but these too require significant anchoring to prevent them from being displaced by heavy winds and to prevent debris thereon from being swept into the pool.

As mentioned briefly hereinabove, another problem encountered when using water-filled tubes is leaking from faulty seams which defect typically does not become evident until after installation, and most often doesn't manifest itself until during the cold winter months. Additional disadvantages to using soft-walled water-tubes include their susceptibility to abrasion damage from contact with rough surfaces, such as a concrete walk. This kind of abrasion typically occurs during installation or removal of the water-tubes. The water-tubes are also susceptible to damage from birds, rodents, raccoons, dogs, and other animals, as well as insects, such as termites and ants. The water-filled tubes are also susceptible to splitting along their seams due to the expansion of freezing water. Leakage from the plastic tubes is typically slow and it is often a practical impossibility to locate small holes and it is extremely difficult to properly patch holes in the walls of the water-tubes or leaking seams.

In the event that one or more, or, in fact, all of the water-filled plastic tubes are accidentally drained of water, the cover may be damaged by being blown off the pool or sliding into the pool due, for example, to the weight of snow, rain, water or other debris collecting on the cover. In those cases where water-filled tubes fall into the pool, the tubes sink to the bottom of the pool and, when secured to the cover by cover loops or weldments, drag the cover to the bottom of the pool.

Under the best of circumstances it is an extremely tedious job to remove water-filled plastic tubes and the cover from the pool. It is much more so when the water-tubes and the cover have become partially or completely submerged in the pool to be opened or recovered. In addition, the water in the pool is most likely contaminated with debris, leaves, and dirty water which was previously collected upon the top surface of the cover, further contributing to the laborious job of cleaning the pool. More importantly, the pool itself may be damaged by the debris or subsequent exposure, necessitating potentially extremely expensive repairs.

Even assuming that damaged plastic tubes are replaced with new tubes before the cover has blown off the pool or into the pool, it is still an extremely tedious job to replace water-tubes during the fall, winter or spring seasons. The highly probable need to do so when utilizing water-tubes as pool cover or ground cover anchors significantly reduces their desirability as anchoring means.

Emptying those water-tubes that haven't emptied themselves by late spring-time is accomplished by opening the Roberts valve, a sometimes difficult task. Once the valve is open, the end of the water-tube farthest from the Roberts valve is lifted and is held a significant spaced distance above the ground until the water runs out of the valve opening which is typically a small opening. Since a water-tube having a length of four feet may easily weigh between 40 and 80 pounds, and since an average in-ground pool may require twenty to thirty such bags, the energy required for tile task can be quite tiring. The water remaining in the tube, after the tube is drained, is removed by pressing the tube flat. The tube must then be cleaned and scrubbed, set out to dry and then folded or rolled up for storage during which time it is susceptible to damage from rodents, insects and the like and may be further subjected to staining due to fungus growth along the interior surface of the tube caused by incomplete water drainage. The fungus grows through the plastic to the outer surface yielding an unsightly stained appearance.

It is thus advantageous to provide a water-filled enclosure capable of maintaining a pool cover or ground cover in place, is inexpensive to rpoduce and ship and yet overcomes all of the disadvantages of the water-tubes presently known.

SUMMARY OF THE INVENTION

One exemplary embodiment of the present invention is characterized by to comprising an enclosure consisting of a container having a releasably mounted lid, designed to promote the run-off of water, snow and debris such as fallen leaves and twigs which would otherwise collect thereon and a vapor barrier for preventing loss of moisture. The container has a flat rigid base portion to prevent rolling and for providing a large contact surface or holding surface for engaging a pool cover or ground cover to retain it in position. The enclosure should be easy to set up, fill and cover as well as easy to empty and requiring no valve which could be a potential source of leakage and may dramatically affect the cost of production. The enclosure is preferably formed of a suitable plastic having a specific gravity less than one, which is easy to clean and dry and which retains its color and appearance without any special handling or cleaning required. The plastic material does not stain and, due to the ease in which the container and lid may be cleaned and dried, fungus is prevented front growing in the container components. The chemical composition of the plastic material and the wall thickness of the enclosure substantially prevents damage to the enclosure due to animals or insects. The plastic material has a long, useful operating life and, due to the stability of the enclosure, the need for cover loops or other means for permanently securing the water-filled anchors to the cover is substantially eliminated.

One embodiment of the present invention comprises a rigid, elongated, substantially box-like, watertight, seamless container having a width which is preferably greater than the depth of the container and having a length which is significantly greater than either the width or the depth although the height may be greater than the width, if desired, so long as the length of the enclosure is ranch greater than the width or height. The container is provided with a substantially flat base having tapered side walls which make the container easily nestable and stackable, thus significantly reducing the space required for storage of the enclosures when not in use as well as significantly affecting the cost of shipping the containers to market. The container side walls terminate in an outwardly directed flange whose free end terminates in a downwardly-directed lip. The container is provided with a lid having a substantially peaked triangular conformation, much like a peaked roof, with no flat or depressed areas and having no projections, ridges or the like on its outer surface which may inhibit the run-off of rain, snow or fallen leaves which may otherwise tend to collect thereon. The lowermost edges of the lid comprise a downwardly projecting flange having inwardly projecting locking tabs for releasably engaging the downwardly-directed lip of the outwardly directed flange on the container's side walls.

In the event that the container cover is loosely fitted to the container, or alternatively, in the event that the cover does not engage the surface of the water, but is displaced therefrom so that the water is exposed to the atmosphere through openings provided in the container, the amount of water lost to evaporation and/or vapor pressure is appreciable. Since the containers are maintained outdoors for extended periods of times, which can amount to many months of exposure to wind, temperature and the sun, the loss of water is quite substantial. Since the water-filled container serves as a ballast, it is important that it remain as full as is practicable, thereby necessitating means for preventing and/or making up for water loss. In a preferred alternative embodiment of the present invention, the surface of the water which is used as ballast to fill the container is substantially covered with a vapor barrier which is then protected by being covered over with the rigid lid. One example of a suitable vapor barrier includes a plastic film which may be buoyant on the surface of the water either due to its lower specific gravity or due to its being provided with features such as air-filled voids otherwise referred to as air pockets or bubbles which increase its buoyancy sufficiently to float it on the water. Another example of a shitable vapor barrier comprises floating a dense layer of extremely low diamter hollow spheres on the surface of the water. A third vapor barrier may comprise pouring thereon a liquid layer or monomolecular film of a relatively non-volatile organic molecule which can effectively prevent or at least substantially inhibit the evaporation of the water layer isolated below. Suitable monomolecular films may include acetic acid, quaternary ammonia compounds, oils, such as olive oil, and the like.

It also may be preferable to use a thin plastic film having some adherent affinity for the plastic from which container is formed, in conjunction with a container which allows slight evaporation in the absence of the vapor barrier. Thusly, the vapor barrier can be sized so that its edges will just make contact with all of the side walls simultaneously when the water level in the container is at three quarters or some other desirable level which allows sufficiently for ice expansion. In this way, the fear is reduced that a consumer will overfill the container since the water level will self-adjust by evaporation to the predetermined level at which the vapor barrier contacts and adheres to all side walls, at which point, the evaporation is halted.

In all of the embodiments of the present invention described herein, it may be considered desirable to admix a release agent with the plastic material prior to molding the container, or to coat the interior surface of the walls thereof afterwards to facilitate the movement of ice which may form within the container and thereby prevent the cracking often associated with frozen plastic water containers. The tapered shape of the container's side walls further facilitates ice movement. The interior surfaces of the container and lid are substantially smooth to further prevent ice from adhering thereto, with the possible exception of indicia provided for advising consumers of the proper levels to which to add water and possibly a liquid vapor barrier, otherwise known as "fill lines."

Another embodiment of the container which may aid in preventing damage due to ice expansion, includes a plurality of truncated hollow cone-shaped projections which have their base portions integrally joined to the base of the container and extend upwardly. The projections are of a height sufficient to engage the interior surface of the lid along the central longitudinal axis enabling the projections to serve the dual functions of being yieldable to absorb some of the forces of the expanding water as it freezes and to serve as a support for the cover while the conical shape further contributes to the ease of removal of ice from the container.

The container may be provided with ribs along the side walls thereof to increase the structural strength. The container preferably has a wall thickness in the range of from 0.04 to 0.08 inches. The container is preferably molded and is totally seamless so as to prevent the container from cracking, breaking or leaking along such seams to provide an excellent watertight structure.

As described hereinabove, the lid has a substantially peaked or pyramidal-shaped central portion whose perimeter is surrounded by a downwardly directed flange which terminates in an inwardly-directed lip or locking tabs for releasably engaging the downwardly-directed lip of the container's side walls. The lid has an outer perimeter whose shape conforms with that of the container to provide a substantially snug-press fit therebetween.

The flanges extending along the longitudinal sides of the lid may alternatively be provided with downwardly extending integral locking pins having offset head portions for releasably joining and locking the lid to the container. The enclosure may be prevented from being overfilled due to the presence of the overflow openings which may be provided along the side walls of the container at a level above the fill lines and vapor barrier.

The flat, rigid base substantially prevents the enclosure from being tipped over. The base may be provided with reinforcing ribs which further contribute to firm frictional engagement between the bottom surface of the container base and the top surface of the pool cover or ground cover. The surface contact of container having the identical width and length of a water-tube with the pool cover is at least as large and, in fact, is at times significantly larger than the surface contact area between water-filled tubes and a pool or ground cover since the bottom surfaces of the water-tubes always tend to curve and even more so as the water in the tubes freezes, thereby lifting the edges of the water-tubes away from the pool or ground cover. The container has a thickness which is as much as four times greater than the thickness of water-filled plastic tubes, yielding a rigid, watertight enclosure which is rugged and able to withstand even rough handling. The enclosure lid is easily installed and removable permitting fast and easy set up and filling as well as fast and easy emptying. The enclosure retains its shape and appearance and structural strength even under extreme outdoor weather conditions. The plastic material used to mold the enclosure has a specific gravity of less than one, is opaque to prevent algal growth and is provided with a UV inhibitor which yields an enclosure that resists fading and cracking. In addition, the enclosure has a low silhouette and an attractive appearance which may of course be further enhanced by using different well-known plastic colorants.

In the preferred embodiment, the present invention can take advantage of ambient precipitation, such as, rain, melting snow, condensation or the like by providing the cover with covered channels or water collection troughs having openings for feeding the collected water into the container and along the side walls so that the water may pass between the side wall interior and the perimeter of the vapor barrier cover.

As another alternative embodiment, the vapor barrier may comprise a lightweight, thin-ganged, flexible plastic bag, which is placed within the container and filled with water through a shitable opening which is covered either by a suitable flap or other suitable closure means. The plastic bag assumes the shape of the container and need only be sufficiently rugged to withstand the elements since the container is relied upon to protect and support the bag and maintain the proper shape. The container is then provided with a cover of the design set forth hereinabove to prevent debris from collecting on the container and upon the bag and to protect the bag from the elements, debris and the like.

As still another alternative arrangement, the cover may be provided with a closure arrangement which cooperates with the container to provide a releasable substantially airtight fitting to prevent evaporation. This may be achieved by use of a rubber or silicone gasket, for example, which embodiment is only limited by the expense of providing a gasket which must have a circumference measuring at least five and preferably seven feet in length, given a container having an overall length of at least two feet and preferably at least three feet and a preferable width of about six inches.

OBJECTS OF THE INVENTION

It is, therefore, one object of the present invention to provide a novel lightweight, rugged, nestable and stackable plastic enclosure which when filled with water is capable of stably retaining a ground cover, such as a pool cover, in position and which is readily and easily emptied to facilitate cleaning, nesting, stacking and storage when not in use.

Still another object of the present invention is to provide a novel enclosure for retaining pool and/or ground covers in place and being comprised of a container and a removable lid adapted to facilitate both filling and emptying of the enclosure of water and keeping the water free of dirt and debris and which is designed to be nestable and stackable when not in use.

Still another object of the present invention is to provide a novel enclosure for maintaining ground covers or pool covers and the like in position and being comprised of a substantially rectangular-shaped elongated container having a cooperating releasably mounted lid, said container and lid respectively having associated locking openings and pins for releasably retaining the lid in position while at the same time being easily removable to facilitate emptying and/or filling of the container.

Still another object of the present invention is to provide a novel enclosure for maintaining ground covers, pool covers, and the like in position and being comprised of a substantially rectangular-shaped elongated hollow container having a cooperating releasably mounted lid, said container and lid respectively having associated locking openings and pins for releasably retaining the lid in position while at the same time being easily unlocked to facilitate emptying and/or filling of the container and wherein said container is further provided with overflow openings to prevent release of the lid from the container due to the expansion of water as it freezes.

Still another object of the present invention is to provide a novel enclosure for maintaining ground covers, pool covers, and the like in position and being comprised of a substantially rectangular-shaped elongated container having a cooperating releasably mounted lid, said container and lid respectively having associated locking openings and pins for releasably retaining the lid in position while at the same time being easily unlocked to facilitate emptying and/or filling of the container and wherein the container is provided with yieldable cone-shaped projections which provide the multiple functions of supporting the lid and being yieldable to prevent bowing of the container side walls due to expansion of the water when chilled to form ice.

Still another object of the present invention is to provide a novel enclosure for maintaining ground covers and the like in position and being comprised of a substantially rectangular-shaped elongated container having a cooperating releasably mounted lid, said container and lid respectively having associated locking openings and pins for releasably retaining the lid in position while at the same time being easily unlocked to facilitate emptying and/or filling of the container and wherein the lid is provided with a flange cooperating with a container flange to prevent bowing of the container side walls due to the expansion of water as it is chilled.

Still another object of the present invention is to provide a novel substantially rigid hold-down assembly for pool covers and the like in which means are provided to substantially prevent evaporation of water within the enclosure.

Still another object of the present invention is to provide a novel substantially rigid hold-down assembly for pool cover and the like in which means are provided to substantially prevent evaporation of water within the enclosure and wherein evaporation of the water is prevented through the use of a vapor barrier.

Still another object of the present invention is to provide a novel substantially rigid hold-down assembly for pool covers and the like in which means are provided to substantially prevent evaporation of water within the enclosure and wherein evaporation of the water is prevented through the use of a vapor barrier in the form of a plastic member.

Still another object of the present invention is to provide a novel substantially rigid hold-down assembly for pool covers and the like in which means are provided to substantially prevent evaporation of water within the enclosure and wherein evaporation of the water is prevented through the use of a vapor barrier in the form of a monomolecular layer dispersed upon the surface of the water.

BRIEF DESCRIPTION OF THE FIGURES

For a more complete understanding of the present invention, refernce may be had to the following detailed description of several exemplary embodiments taken in conjunction with the accompanying figures of the drawings, in which:

FIG. 2 is a perspective view showing still another alternative container embodiment of the present invention;

FIG. 3 is a perspective view, partially sectionalized, of the underside of a lid for use with the container of either FIG. 1 or FIG. 2;

DETAILED DESCRIPTION OF THE INVENTION

Figure 1:
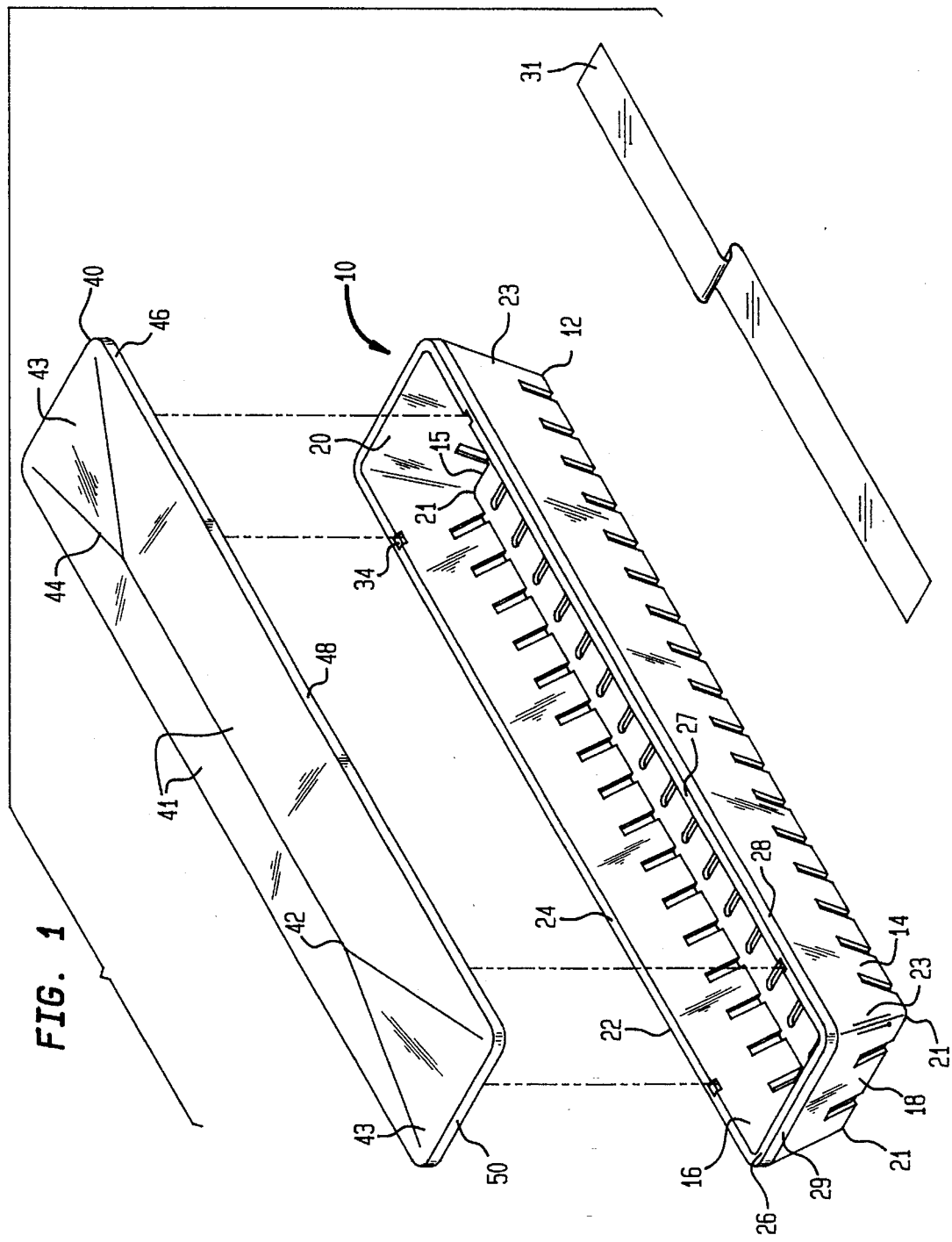
FIG. 1 shows a perspective view of an enclosure designed in accordance with the principles of the present invention.

The enclosure of the present invention comprises a rigid, box-like, seamless, watertight enclosure comprised of a container 10 shown in FIG. 1 having a substantially flat, rigid base 12 and a pair of substantially planar elongated side walls 14 and 16 integral with and extending upwardly and outwardly from base 12. Similarly, substantially planar end walls 18 and 20 are integral with and extend upwardly and outwardly from base 12. The end walls 18 and 20 and side walls merge with base 12 and each side wall merges with a pair of end walls 18 and 20 forming curved corner regions 21 and forming smoothly curved corners 23, respectively.

The end walls 18 and 20 need not be planar and may be curved or bowed outwardly, if desired as long as nestability is retained. Therefore, the curvature imparted must be such that an arc no smaller than 90° from the edge of base 12 is described by the curved walls 14, 16, 18 and 20 as viewed in cross-section.

Longitudinal side walls 14 and 16 and end walls 18 and 20 are provided with vertically extending ribs 15. Noting especially side wall 16 and end wall 18 in FIG. 1, ribs 15 are arranged in spaced parallel fashion and give rise to a slight depression visible on the exterior of side wall 16 and end wall 18 to enhance the structural strength. Similar reinforcing ribs 15 are provided along side wall 14 and end wall 20.

The upper ends of each of the side walls 14 and 16 and end walls 18 and 20 bend outwardly to form a continuous, substantially rectangular-shaped flange 22 defined by elongated side flange portions 24 and end flange portions 26. Each of the side flange portions 24 merge with adjacent flange portions 26 forming curved corners. The outer perimeter of flange 22 bends downwardly to form a substantially, continuous downwardly-directed lip 28 comprised of elongated lip portions 27 and end wall lip portions 29.

Longitudinal flange 24 is provided with means for preventing overfilling of container 10 comprising in one exemplary embodiment overfill openings 34 arranged at spaced intervals therealong. As will be further explained hereinbelow, the overfill openings 34 cooperate with vapor barrier 31 to automatically control the water level inside container 10, thereby preventing overfilling which could lead to cracking or a displaced lid caused by ice expansion while still controlling undesirable evaporation. Overfill openings 34 extend inwardly toward the inner perimeter of flange portion 22 and extend downwardly into an upper portion of the side walls 14 and 16 and end walls 18 and 20.

Lid 40 has means to prevent collection of and to facilitate run-off of water and debris consisting of a pyramidal-shaped upper portion comprising sloping side portions 41 which merge substantially along the longitudinal axis of lid 40 to define peak 42 comprising an angle of 165° or smaller. Additional sloping portions 43 merge with adjacent ends of sloping portions 41 as defined by vertices 44, which vertices 44 are preferably slightly rounded or curved as is the upper vertex or peak 42 to avoid providing so sharp an angle or edge that blown leaves may get caught thereon.

The outer perimeter of lid 40 bends downwardly to form a continuous lip 46 ill comprised of elongated side lip portions 48 and end lip portions 50. Lip 46 conforms in shape and size with lip 28 so that when lid 40 is mounted upon container 10, the inner surface of lip 46 rests against the outer surface of continuous lip 28, which arrangement acts to prevent bowing of the container end walls 18 and 20 and especially elongated side walls 14 and 16 due to the pressure exerted upon the container by expansion of the water as it is chilled.

The inside of lip 46 is provided with a plurality of integral locking tabs 52 extending inwardly towards the longitudinal axis of lid 40 and perpendicular to lip 46. In an alternate embodiment, the underside of lid 40 (seen in FIGS. 3 and 4) has a number of locking pins 62 near each flange equal in number to the locking openings 34 which in this embodiment serve the dual function of being the overfill openings 34 provided along each flange of the container.

Figure 5:
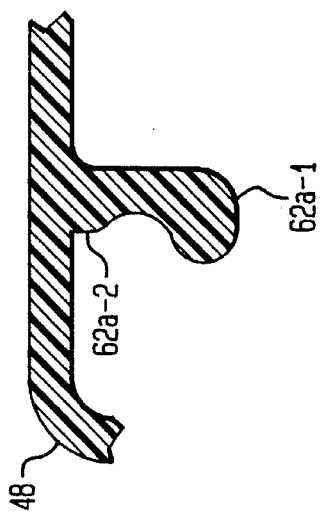
FIG. 5 shows an enlarged elevational view of one of the projections provided in the lid of FIGS. 3 and 4.

Referring to FIG. 5, each of the locking pins is provided with an enlarged substantially spherical-shaped head portion 62a-1 which tapers or narrows to a neck portion 62a-2, as shown best in FIG. 5. The locking pins 62 are forced into an associated locking opening 34 when mounting lid 40 upon container 10 causing the container side walls 14 and 16 and their associated flange portions 24 to move slightly outwardly. The lid 40 also tends to have its locking pins 62 and flange portions move slightly inwardly. Once the enlarged head portion of the pins passes through its associated opening 34, for example, the cover 40 snaps into place upon the container 10 and retains this position unless and until it is removed.

The sloping surface portions 41 and 43 provide means for facilitating the run-off of any water, debris or particulate which may collect upon cover 40 when in use to prevent the cover from becoming unsightly and to prevent its collapse from the weight of accumulated water and debris. The natural run-off of precipitation makes the cover substantially self-cleaning. The enclosure lids 40 are nestable and stackable enabling the lids 40, as well as the containers 10, to be nested and stacked when not in use thereby significantly reducing the required amount of storage space.

The container 10 and lid 40 are preferably molded from a suitable plastic such as, for example, high-density polyethylene, polypropylene, polystyrene, or any plastic material having a specific gravity of less than one. The preferred molding process is injection molding. However, the container and lid may also be blow molded, vacuum formed or may be produced by any other suitable method to provide a rugged, rigid, seamless structure.

The interior walls of both the container and lid and especially the container are made smooth to prevent ice from adhering to the surface. In addition, a releasing agent may either be incorporated into the plastic material preparatory to molding and/or may be utilized to coat the interior of the container and lid to yield a surface engaging the water and ultimately the ice, having a low coefficient of friction to facilitate movement of ice relative to the container. The thickness of the lid and container is preferably of the order of 0.04 to 0.08 inches. Although the lid and container are preferably of the same thickness, as an alternative, the thickness of the lid may be less than the thickness of the container.

The enclosure 1 maximum outer dimensions are such that the width of the container is preferably greater than the depth and the length of the container is substantially greater than its width. In the preferred embodiments, the container has a height of the order of four to six inches, a width of the order of three to six inches measured along the base 12, a width of the order of font to eight inches measured along the flange 22, and a length in the range of from two to six feet, although the container length may be longer than six feet, if desired. Alternatively, the height may be greater than the width without any great loss in stability. For example, the height may be five inches and the width across the top may be font inches.

The lid prevents dirt and debris from entering into the enclosure. The plastic material is extremely rugged and provides an extremely long, useful operating life. The plastic materials mentioned hereinabove will not discolor due to even the most extreme outdoor weather conditions, mildew, or fungus growth.

The enclosures are extremely easy to fill and require no valve or closure, such as a Roberts valve, normally employed in conventional, flexible, plastic water-tubes. There is no concern about over-filling due to the provision of the overflow openings. If no hoses or other water sources are available, the container 10 may be filled by using the water from the pool simply by placing the container below the surface of the water. This approach takes advantage of the chlorine or other like chemicals previously added to the pool to reduce formation of algae. The container, when so filled, is easily handled by the average teenager or adult since it weighs approximately twenty pounds.

The enclosures are also quite simple to empty. The enclosures may be emptied simply by lifting off the lid and tipping over the container thus rapidly draining water from the enclosure. The container need not be held while it is being drained of water, significantly reducing the amount of effort required to be exerted to empty the enclosures. In the remote possibility that an enclosure falls into the pool, it will float and it is very easy to empty, contrary to water-tubes.

Once emptied, the container and lid are easy to maintain. The containers may simply be rinsed with water and left to air-dry or may be dried using heat or a cloth, sponge or other suitable drying means. There is no problem of water remaining within the enclosure interior thereby preventing the growth of any fungus. If desired, the container and lid may be washed with an industrial strength soap (or detergent) and water without damage to the surface or the integrity of the enclosure.

FIG. 2 shows another preferred container embodiment 10' in which like elements as between embodiment 10 in FIG. 1 and embodiment 10' are shown by like designating numerals. Embodiment 10' differs from embodiment 10 in the provision of elongated cone-shaped projections 70 arranged at spaced intervals along the base 12 of container 10' and being aligned substantially along the longitudinal axis of the container.

Figure 6:
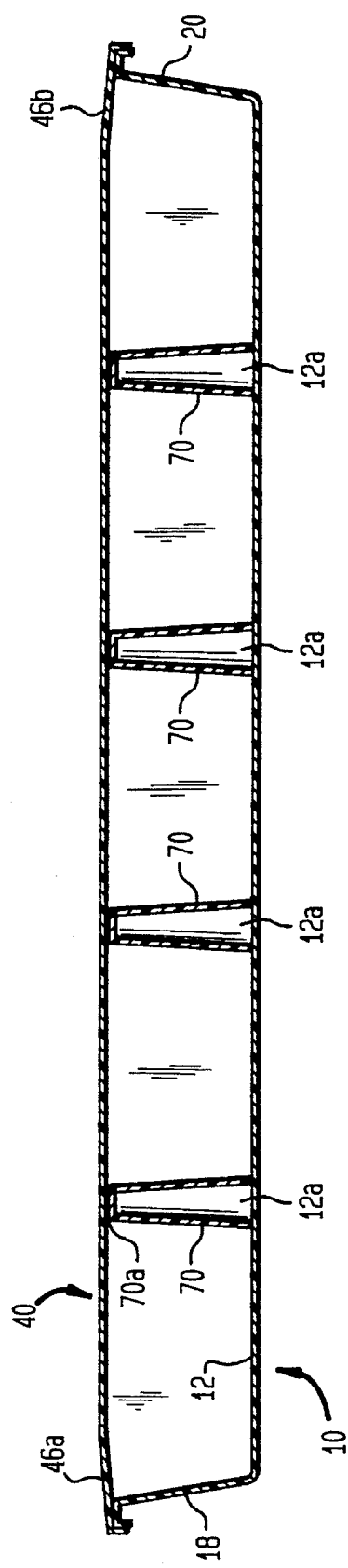
FIG. 6 shows a sectional elevational view of the container embodiment of FIG. 2.
Figure 7:
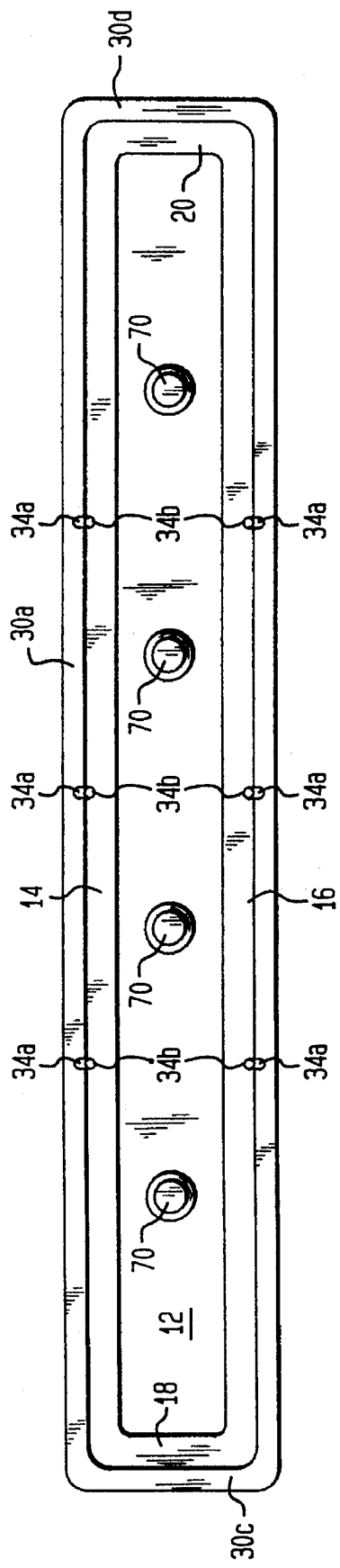
FIG. 7 shows a top plan view of container shown in FIG. 2.

The cone-shaped projections are hollow and openings 12a in base 12 communicate the interior of the cone-shaped projections 70 with ambient air. Projections 70 prevent cold ambient air from freezing the water engaging the cone-shaped projections thereby causing hydraulic pressure of water to act against the tapered surfaces of the cone-shaped projections and force ice upwardly to prevent damage to the sides and base of the container and to prevent unfrozen water from moving upward along the surface of the cone to prevent water from freezing under the peak 44 of lid 40. As can best be seen from FIG. 6, the top ends of the cone-shaped projections 70 are closed at 70a and engage the interior surface of lid 40 in the region of the peak 44 to thereby support lid 40 which, in turn, prevents the container side walls 14 and 16 from bowing due to the expansion of water as it freezes.

Figure 9:
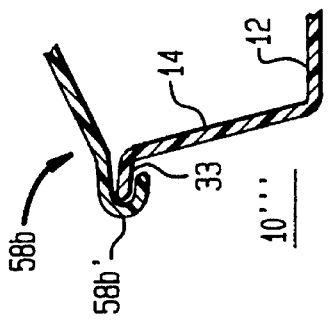
FIG. 9 is a sectional view of a further embodiment of the present invention.
Figure 8:
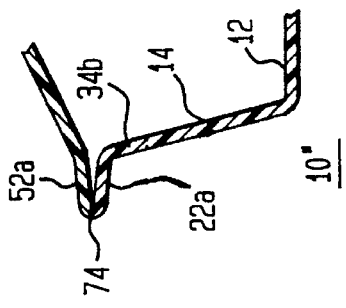
FIG. 8 is a sectional view of a further embodiment of the present invention.

As a further alternative to the embodiments described hereinabove, the lid 40 may be permanently hingedly joined to the container 10, preferably along one longitudinal side of the enclosure, by means of a "living hinge", for example. For example, noting FIG. 8, container flange 22a is hingedly joined by means of a hinge portion 74 to the outer perimeter of cover flange portion 52a. The opposite longitudinal side of the modified enclosure 10" shown in FIG. 8 is preferably substantially similar to the arrangement shown in FIGS. 1 and 11 whereby some combination locking tabs 52 and pins 62 are provided. In FIG. 9, lid 40 snaps into place when tabs 58b' clear the edge of flange 33 and lie just beneath the edge when lid 40 is properly mounted.

Figure 4:
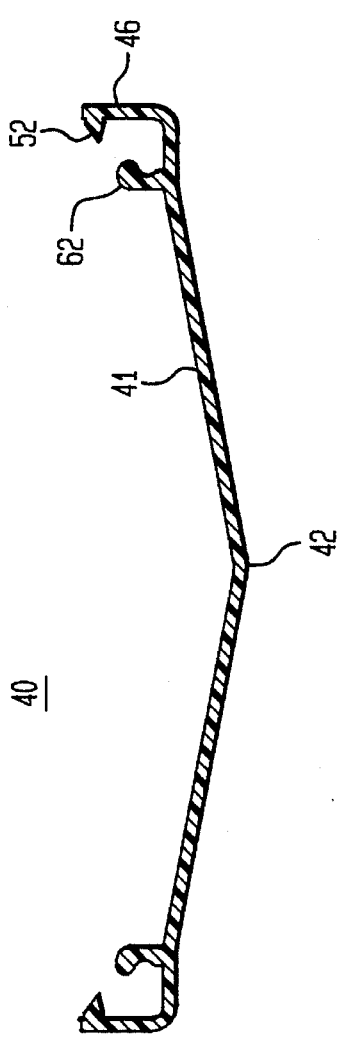
FIG. 4 shows a sectional view of the cover of FIG. 3.

Lip 28 of the container is omitted and the outer free end of the flange portion 33 extends into and is received within a U-shaped lip portion 58b' which is an alternative embodiment to locking tab 52 of lid 40 as seen in FIG. 4.

Figure 10:
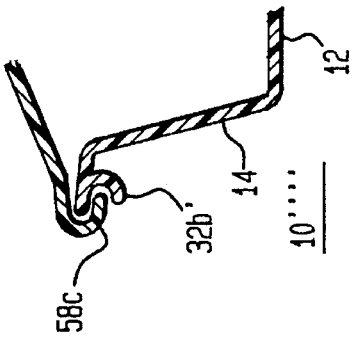
FIG. 10 is a sectional view of a further embodiment of the present invention.

As still another embodiment shown in FIG. 10, container 10"" has a U-shaped downwardly-depending lip 32b' whose free and defines a groove of substantially U-shaped lip 32b' provided as an integral part of container 10"". The opposite longitudinal sides of the container may be similar in design and function to the longitudinal flange portion 22. Alternatively, both longitudinal sides of the container 10"" and lid 40 may have the flanges and cooperating grooves shown in FIG. 10.

The manner in which a cover (such as a pool cover) is retained in place is by placing a plurality of enclosures of the type shown, for example, in FIG. 1 about the perimeter of the pool cover or tarpaulin. The cover is typically placed over the swimming pool and is of a size sufficient to extend a suitable distance, usually of the order of two feet, beyond the perimeter of the pool. The enclosures are placed at spaced intervals upon the marginal portion of the cover just outside the outer perimeter of the pool. The enclosures are typically arranged at spaced intervals along the marginal portion of the pool cover so that their ends are about four to five inches front adjacent enclosures. However, a greater or lesser spacing may be utilized, if desired. In one practical example, for a cover having a total of ninety-six feet about the perimeter of the cover, thirty-two containers may be provided. The containers are stored when not in use and are preferably packed twenty to a storage box with the covers being stacked and nested separately from the stacked, nested containers.

The enclosures are sufficient to anchor the cover to enable an adult (or an animal) to step on the portion of the cover extending over the water in the pool such that the cover easily withstands and supports the weight of such person.

As was mentioned hereinabove, since the enclosures remain outdoors for substantial periods of time and in many cases, the better part of a year, containers as shown in the embodiments of FIGS. 1–10 may be subjected to significant water evaporation due to their exposure to sun, wind and barometric conditions, for example. Since the retention of the water is important in order to provide the proper ballast for the pool cover, vapor barrier means, such as those to be described hereinbelow, may be provided to substantially prevent evaporation or reduce evaporation to an insignificant amount.

Figure 11:
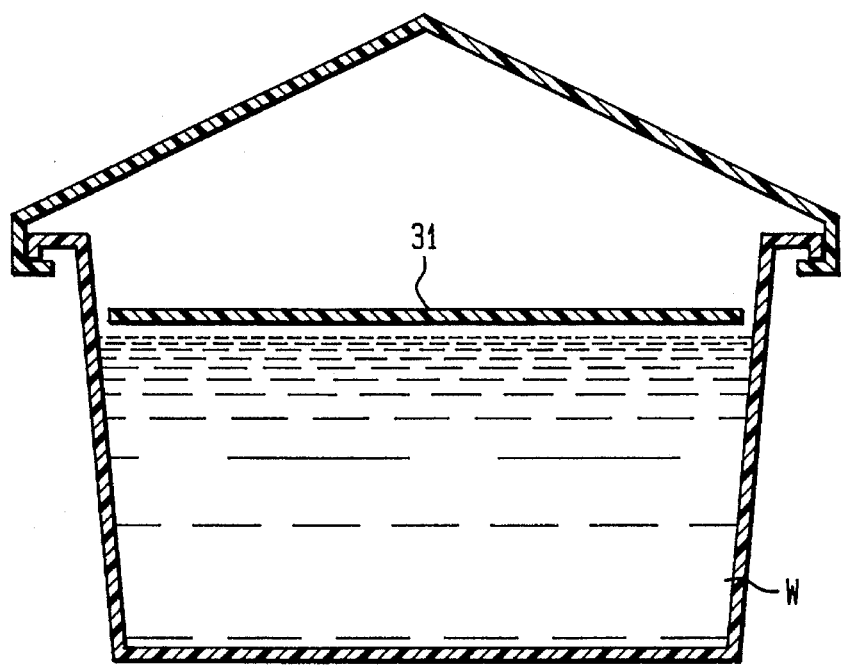
FIG. 11 shows a sectional view of one alternative embodiment for a vapor barrier for use in the present invention.
Figure 13:
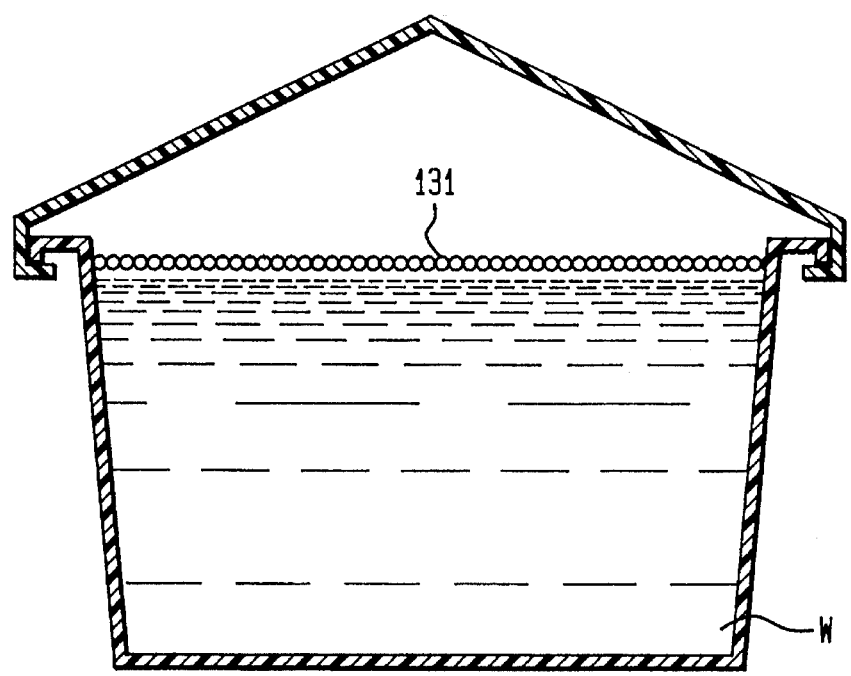
FIG. 13 shows a sectional view of another alternative embodiment for a vapor barrier for use in the present invention.

In one embodiment shown in FIGS. 1 and 11, a positively buoyant vapor barrier 31 formed of polyethylene film or polyethylene foam sheeting is placed upon the surface of the water W. The sheeting is of a size sufficient to cover substantially the entire surface of the water within the container. Polyethylene has a specific gravity of less than one, enabling it to float. Any other shitable material having a specific gravity of less than one may be employed. Alternatively, as seen in FIG. 13, a plastic material having a specific gravity greater than one and having air pockets or bubbles 131 such as foamed PVC or what is commonly referred to as "bubble wrap" so as to yield a buoyant sheet may be employed as an alternative to polyethylene film or foam or any other plastic material having a specific gravity of less than one. The film may be of any thickness over the range of one to eighteen mils, for example. The film may be flexible or rigid so long as it is of a size to substantially cover the entire surface area of the water. Since the amount of water evaporation is a function of its exposed surface area, so long as the exposed surface area is insignificant or minimal, the amount of evaporation will be insignificant, enabling the enclosure 10 to provide proper ballast for the pool cover. The container 10 may be provided with a lid 40, if desired. The overflow openings 34 work in conjunction with a vapor barrier. Without the vapor barrier 31, the overflow openings 34 would allow too much evaporation of the water ballast. Similarly, without the overflow openings 34, there exists the possibility that a user will overfill the container which could lead to the lid 40 popping off in a freeze as the freezing water expands.

Figure 12:
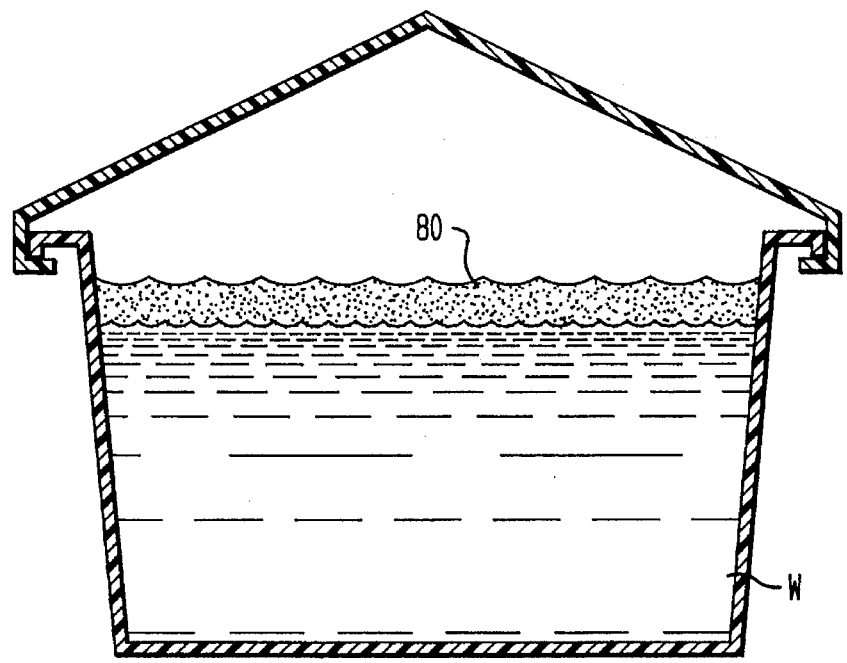
FIG. 12 shows a sectional view of another alternative embodiment for a vapor barrier for use in the present invention.

As a further alternative illustrated in FIG. 12 the vapor barrier 80 may comprise a monomolecular film, such as a surfactant or wetting agent, which cover substantially the entire surface of the water in container 10. The manner of use is such that, after the container is filled with water, the liquid comprising the monomolecular film is poured into the container and automatically disperses over the entire surface of the liquid to thereby form a vapor barrier of a thickness of one molecule. In the event that the contents of container 10 are disturbed due to wind or precipitation, the monomolecular film will automatically redisperse itself over the water surface to provide a vapor barrier which significantly reduces evaporation. Materials which may be employed to provide such a monomolecular vapor barrier include acetic acid, oils, such as olive oil, quaternary ammonia compounds, as well as other like materials, such as, materials sold under the trademark KEEP IN HEAT, manufactured by Great Lakes Manufacturing Company. Any other suitable monomolecular vapor barrier films may be employed. It is preferred that container 10 does not have overflow openings in order to prevent the undesired loss of the monomolecular film due to the introduction of water due to natural precipitation.

Figure 14:
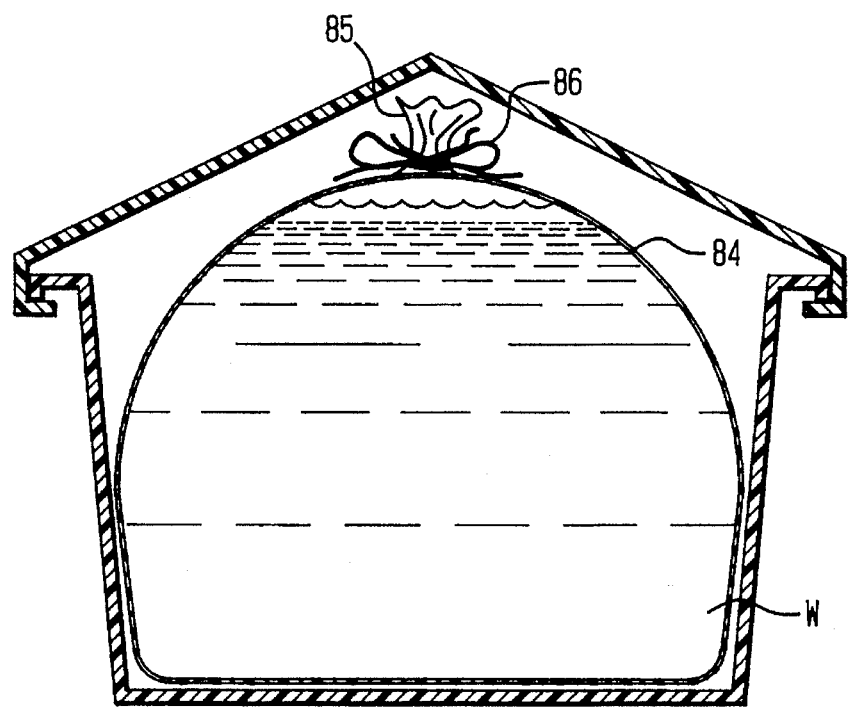
FIG. 14 shows a sectional view of another alternative embodiment for a vapor barrier for use in the present invention.

FIG. 14 shows still another embodiment of the present invention in which container 10 is provided with a thin plastic envelope 84 which is substantially watertight, but due to its extremely thin gauge, has no structural support capability. The envelope may have an opening similar to that of a conventional paper bag and be twisted at its open end 85 and provided with a tying means 86. Alternatively, the bag 84 may have a flap which is positionable and sealable over open end 85.

As another alternative, the closure may be a conventional sliding closure in which a sliding closure member seals the two cooperating closure ends when moved in a first direction and separates the closure ends when moved in a second direction, similar to a "ZIPLOC" (Trademark) bag. The closure ends may also be sealed by pressing them together with the fingers and opened by "peeling" the closure ends apart, eliminating the sliding closure member. A cover, such as, for example, cover 40 shown in FIG. 1, must still be employed to prevent debris from falling into the container.

As another alternative, a closure arrangement, such as is shown in FIGS. 9 and 10, may be utilized to provide an adequate airtight seal between container 10 and lid 40 to prevent evaporation.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. Apparatus for retaining a cover in position comprising:
   a substantially box-like watertight elongated container adapted to be substantially filled with water and having a substantially flat rigid base and tapered side walls enabling nestability and stackability of said containers, said tapered side walls being provided with means for preventing overfilling located a distance above said base;
   a lid including means for releasably securing the lid to said container, said lid having an upper portion including means to prevent collection of and to facilitate run-off of water and debris from said lid; and
   vapor barrier means for preventing the evaporation of water from said container, whereby a consumer fills said enclosure with water up to said means for preventing overfilling, places said vapor barrier means upon the surface of the water and releasably locks said lid onto said container.

2. The apparatus of claim 1 wherein said container, said lid, and said vapor barrier means are each positively buoyant in water.

3. The apparatus of claim 1 wherein said means for preventing collection of and facilitating run-off of water and debris comprises said upper portion being adapted to consist of upper surfaces forming a pyramidal-shape having an angle less than 165 degrees.

4. The apparatus of claim 1 wherein said side walls have upper ends defining a continuous top rim of said container, at least a portion of said rim being curved outwardly, thereby defining at least one flange, said flange curving downwardly to form a downwardly-directed lip.

5. The apparatus of claim 4 wherein said lid is provided with a continuous, downwardly-directed integral cover flange having a shape which substantially conforms to the shape of said at least one container flange and said downwardly directed lip such that a snug fit is achieved between said cover flange and lip and said container flange when said lid is mounted upon said rim of said container.

6. The apparatus of claim 5 wherein said cover flange is continuous around the edge of said lid, and wherein said continuous integral cover flange curves downwardly along an outer perimeter of said flange to define a continuous, downwardly-directed cover lip which engages an outer perimeter of said container rim, said downwardly-directed cover lip having at least one inwardly-directed locking tabs positioned to cooperate with said container lip, whereby said lid is releasably locked onto said container when mounted upon said rim of said container and pressed down upon.

7. The apparatus of claim 1 wherein said container and lid are formed of a plastic having a thickness in the range of front 0.04 to 0.08 inches.

8. The apparatus of claim 1 wherein said side walls are comprised of substantially planar side walls and end walls, said side walls and end walls being curved at the corner regions where each of said side walls meets one of said end walls and where said side walls and end walls meet the base of said container.

9. The apparatus of claim 1 wherein said enclosure has a length in the range of from two to six feet, a width along the base of the order of three to six inches, a width along the top of the container of the order of four to eight inches, and a height of the order of four to six inches.

10. The apparatus of claim 1 wherein tile width of said enclosure measured along the base is greater than the height of said enclosure and wherein the length of said enclosure is substantially greater than the width of said enclosure measured along the top of the container and the base of the container.

11. The apparatus of claim 1 wherein said vapor barrier means comprises a plastic sheet.

12. The apparatus of claim 11 wherein said plastic sheet is flexible and has a thickness in the range of from one to eighteen mils.

13. The apparatus of claim 11 wherein said plastic sheet has formed therein enclosed bubbles of air such that said sheet is positively buoyant in water.

14. The apparatus of claim 11 wherein said plastic sheet consists essentially of foamed PVC.

15. The apparatus of claim 1 wherein one longitudinal edge of said lid and outer edge of one of said side walls are adapted to be hinged together and the opposite edges of said lid and said side wall are adapted to releasably lock together.

16. The apparatus of claim 1 wherein said lid and said container are integrally joined together along one edge of said lid and an outer edge of a first of said side walls by a flexible living hinge and the opposite edges of said lid and said side wall opposite said first side wall are adapted to releasably lock together.

* * * * *